(No Model.)
J. LE ROY.
VEHICLE REACH.
No. 256,009. Patented Apr. 4, 1882.
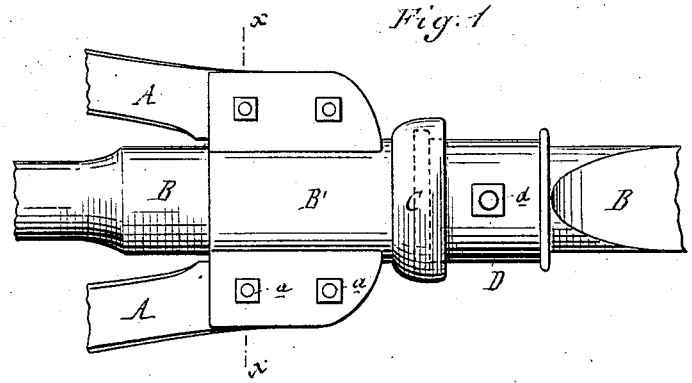
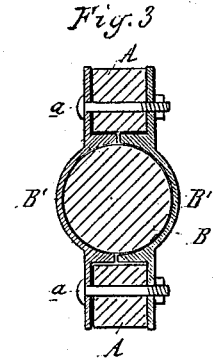
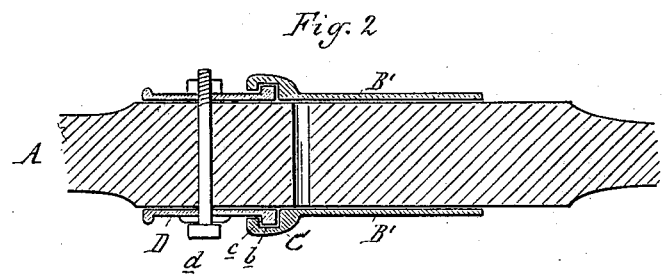
Attest:
A. Barthel
Inventor:
Joseph Le Roy
per Thos. S. Sprague
Att'y

UNITED STATES PATENT OFFICE

JOSEPH LE ROY, OF BELLEVILLE, MICHIGAN, ASSIGNOR OF ONE-HALF TO C. S. WHIPPLE, OF SAME PLACE.

VEHICLE-REACH.

SPECIFICATION forming part of Letters Patent No. 256,009, dated April 4, 1882.

Application filed December 12, 1881. (No model.)

*To all whom it may concern:*

Be it known that I, JOSEPH LE ROY, of Belleville, Wayne county, Michigan, have invented an Improvement in Wagons, of which the following is a specification.

The nature of this invention relates to certain new and useful improvements in the construction of wagons, and particularly relates to the construction of the reach, whereby the same is relieved from torsional strain; and the invention consists in the peculiar construction, arrangement, and various combinations of the parts, all as more fully hereinafter set forth.

Figure 1 is a plan view of a portion of a reach and the rear hounds of a wagon provided with my improvement. Fig. 2 is a longitudinal central section. Fig. 3 is a cross-section on line $x\ x$.

In the accompanying drawings, which form a part of this specification, A represents the forward ends of the rear hounds of a wagon, and B the reach, which latter is preferably round.

B' B' represent hound-plates, which are rigidly secured to the ends of the hounds, upon the upper and lower faces thereof, by means of proper bolts, $a$, which thus secure the hounds together. The forward end of each of these hound-plates terminates in a semicircular flange, C, in the inner faces of which is formed a channel, $b$, to receive the flange $c$ of the sleeve D, which slips over the reach and is retained in the desired position by means of a bolt, $d$, which passes through such thimble or sleeve and through one of a series of holes in the reach. Between the side wings of the plates B' the said plates are formed in the segment of a circle, between which the reach passes.

It will be seen that by this construction the forward or rear wheels of a wagon provided with this device can readily pass over any obstruction without disturbing the other and without exerting any strain whatever upon the reach, as it is capable of turning clear around between the hound-plates.

What I claim as my invention is—

1. In combination, with the hound-plates B', made in two detachable sections, each having a semi-cylindrical groove or channel, the sleeve D, provided with a flange to fit in the channels in the hound-plates, substantially as and for the purpose specified.

2. In combination, with the separate hound-plates B' B', provided with the channels $b$, the sleeve D, provided with a flange, $c$, to fit in said channels $b$, both the hound-plates and the sleeve being provided with an unobstructed opening to allow the free passage through them of the reach, substantially as and for the purpose specified.

JOSEPH LE ROY.

Witnesses:
   H. S. SPRAGUE,
   RICHD. TREGASKES.